(12) United States Patent
Beranek et al.

(10) Patent No.: US 11,422,314 B2
(45) Date of Patent: Aug. 23, 2022

(54) DUSTCAP WITH BUILT-IN CLEANER

(71) Applicant: Clearfield, Inc., Minneapolis, MN (US)

(72) Inventors: Cheryl Johnson Beranek, Minnetonka, MN (US); John P. Hill, Oak Grove, MN (US); William J. Cruzen, Monticello, MN (US); James John Henschel, Chula Vista, CA (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 17/028,083

(22) Filed: Sep. 22, 2020

(65) Prior Publication Data

US 2022/0091347 A1  Mar. 24, 2022

(51) Int. Cl.
*G02B 6/38* (2006.01)

(52) U.S. Cl.
CPC ......... *G02B 6/3866* (2013.01); *G02B 6/3849* (2013.01); *G02B 6/3882* (2013.01)

(58) Field of Classification Search
CPC ... G02B 6/3849; G02B 6/3866; G02B 6/3882
See application file for complete search history.

(56) References Cited

U.S. PATENT DOCUMENTS

| | | | |
|---|---|---|---|
| 1,459,589 A | 6/1923 | Hoffman | |
| 6,398,422 B1 | 6/2002 | Szilagyi et al. | |
| D623,369 S * | 9/2010 | Sugita | D32/35 |
| 8,041,177 B2 * | 10/2011 | Zimmel | G02B 6/3849 |
| | | | 385/139 |
| 10,481,342 B1 | 11/2019 | Yang et al. | |
| 10,739,531 B2 | 8/2020 | Takanashi et al. | |
| 2002/0166190 A1 * | 11/2002 | Miyake | G02B 6/385 |
| | | | 15/210.1 |

(Continued)

FOREIGN PATENT DOCUMENTS

| JP | 2019-200411 A | 11/2019 |
|---|---|---|
| WO | 2018199331 A1 | 11/2018 |

OTHER PUBLICATIONS

International Search Report and Written Opinion dated Aug. 13, 2021, from corresponding International Application No. PCT/US2021/029852, International Filing Date Apr. 29, 2021.

(Continued)

*Primary Examiner* — Daniel Petkovsek
(74) *Attorney, Agent, or Firm* — Troutman Pepper Hamilton Sanders LLP

(57) ABSTRACT

A dustcap comprises a body having a cylindrical portion configured to receive a ferrule of an optical fiber connector, and an end portion opposite the cylindrical portion. The end portion includes a receptacle. The dustcap has a built-in cleaner disposed within the receptacle. The dustcap further comprises a removable cover configured to couple to the end portion of the dustcap. In another embodiment, the end portion includes a flat surface, the cleaner is disposed on the flat surface of the end portion, and the cover is configured to receive the end portion of the dustcap. In another embodiment, the cover has a receptacle and the cleaner is disposed within the receptacle, whereas the body comprises an end portion configured to receive at least a portion of the cover with the built-in cleaner. Embodiments encompass cleaner assemblies and adapter dustcaps having built-in cleaners.

14 Claims, 16 Drawing Sheets

(56) References Cited

U.S. PATENT DOCUMENTS

| | | |
|---|---|---|
| 2010/0302530 A1 | 12/2010 | Liu et al. |
| 2011/0229088 A1 | 9/2011 | Isenhour et al. |
| 2016/0349459 A1 | 12/2016 | Collier et al. |
| 2017/0254963 A1* | 9/2017 | Sparrowhawk .......... G02B 6/25 |
| 2018/0120515 A1 | 5/2018 | Samal et al. |

OTHER PUBLICATIONS

International Search Report and Written Opinion dated Dec. 23, 2021, from related International Application No. PCT/US2021/051118, International Filing Date Sep. 20, 2021.

* cited by examiner

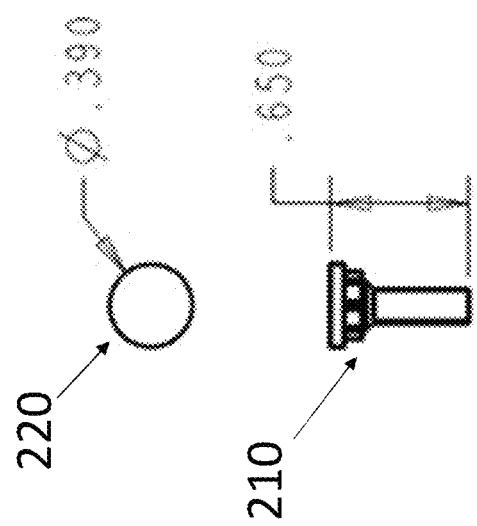

DUSTCAP WITH BUILT-IN CLEANER

TECHNICAL FIELD

The present disclosure relates generally to optical fiber systems and more specifically to dustcaps for optical fiber connectors.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. In instances when the connection may be exposed to weather conditions, an essentially waterproof configuration of components is needed. With the increasing desire for completely optical networks, "fiber to the premises" (FTTP) or "fiber to the home" (FTTH) systems are being developed to provide optical fibers that extend from the source to the site of the end-user. Optical fiber enclosures are used for management of cables that extend to various user locations.

To interconnect the cables, various cable connector designs provide for low insertion loss and stability. Some example connectors may include, but are not limited to, SC, Dual LC, LC, ST and MPO connectors. For example, ferrules (one in each connector, or one in the connector and one in the apparatus or device), each containing an optical fiber end, are butted together end to end and light travels across the junction.

Dirt or contamination on the end of a ferrule of an optical fiber connector hinders performance. Cleaning of optical fiber connectors and ferrules is essential to providing quality fiber installations. Thus, there is a need to inspect fiber optic connectors and conveniently clean them when necessary.

SUMMARY

According to one aspect, there is provided a dustcap comprising a body. The body comprises a cylindrical portion configured to receive a ferrule of an optical fiber connector, and an end portion opposite the cylindrical portion, wherein the end portion includes a receptacle. The dustcap further comprises a cleaner disposed within the receptacle, and a cover configured to couple to the end portion of the dustcap. The cover may be removable from the end portion of the dustcap. The cover may comprise a plurality of tabs configured to snap on the end portion of the dustcap. The body may further comprise a divider between the cylindrical portion and the end portion of the dustcap. In some embodiments, the end portion may have a tapered portion. In some embodiments, the cylindrical portion may have a first diameter and the end portion may have a second diameter larger than the first diameter. In some embodiments, the body may comprise a single integral piece.

According to another aspect, there is provided a dustcap comprising a cover having a receptacle. A cleaner is disposed within the receptacle. The dustcap further comprises a body having a cylindrical portion configured to receive a ferrule of an optical fiber connector, and an end portion opposite the cylindrical portion, wherein the end portion is configured to receive at least a portion of the cover. The cover may be removable from the end portion of the dustcap. The cover may comprise a plurality of tabs configured to snap into the end portion of the dustcap. In some embodiments, the body may further comprise a divider between the cylindrical portion and the end portion of the dustcap. In some embodiments, the end portion may have a tapered portion. In some embodiments, the cylindrical portion may have a first diameter and the end portion may have a second diameter larger than the first diameter. In some embodiments, the body may be configured as an integral piece.

According to another aspect, there is provided a dustcap having a body comprising a cylindrical portion configured to receive a ferrule of an optical fiber connector, and an end portion opposite the cylindrical portion, wherein the end portion includes a flat surface. The dustcap further comprises a cleaner disposed on the flat surface of the end portion. The dustcap further comprises a cover configured to receive the end portion of the dustcap. The cover may be removable from the end portion of the dustcap. The cover may comprise a plurality of tabs configured to snap on the end portion of the dustcap. In some embodiments, the body may be provided as a single integral piece. In some embodiments, the end portion may have a tapered portion. In some embodiments, the cylindrical portion may have a first diameter and the end portion may have a second diameter larger than the first diameter.

The present disclosure is not limited in terms of the particular embodiments described in this application, which are intended as illustrations of various aspects. Many modifications and variations can be made without departing from its spirit and scope, as will be apparent to those skilled in the art.

BRIEF DESCRIPTION OF THE FIGURES

FIG. 3C shows an exemplary size of the dustcap of FIG. 3A according to aspects of the present disclosure;

DETAILED DESCRIPTION

Inspection and cleaning of fiber optic connectors and ferrules is essential to providing reliable optical fiber connections. Aspects of the present disclosure are directed at dustcaps with built-in cleaners for optical fiber connectors and ferrules. Embodiments provide an easy and convenient way to clean an optical fiber connector and ferrule when necessary, using a cleaner embedded within the connector's dustcap. Embodiments of the dustcaps disclosed herein may be configured for use with different types of connectors and ferrules, including but not limited to SC, Dual LC, LC, ST and MPO connectors. Various embodiments may be configured to receive either a ferrule or a portion of an optical fiber connector. Various embodiments may also be configured as adapter dustcaps with built-in cleaners. Embodiments may also be used conveniently in the field at any network location. A dustcap with a built-in cleaner may be provided separately or as a component of an optical fiber connector. Embodiments may also be configured as cleaner assemblies configured to fit on dustcaps. Embodiments thus simplify the connector cleaning process, thereby simplifying deployment and repair of connectors, and improving network reliability.

Figures 1A, 1B:
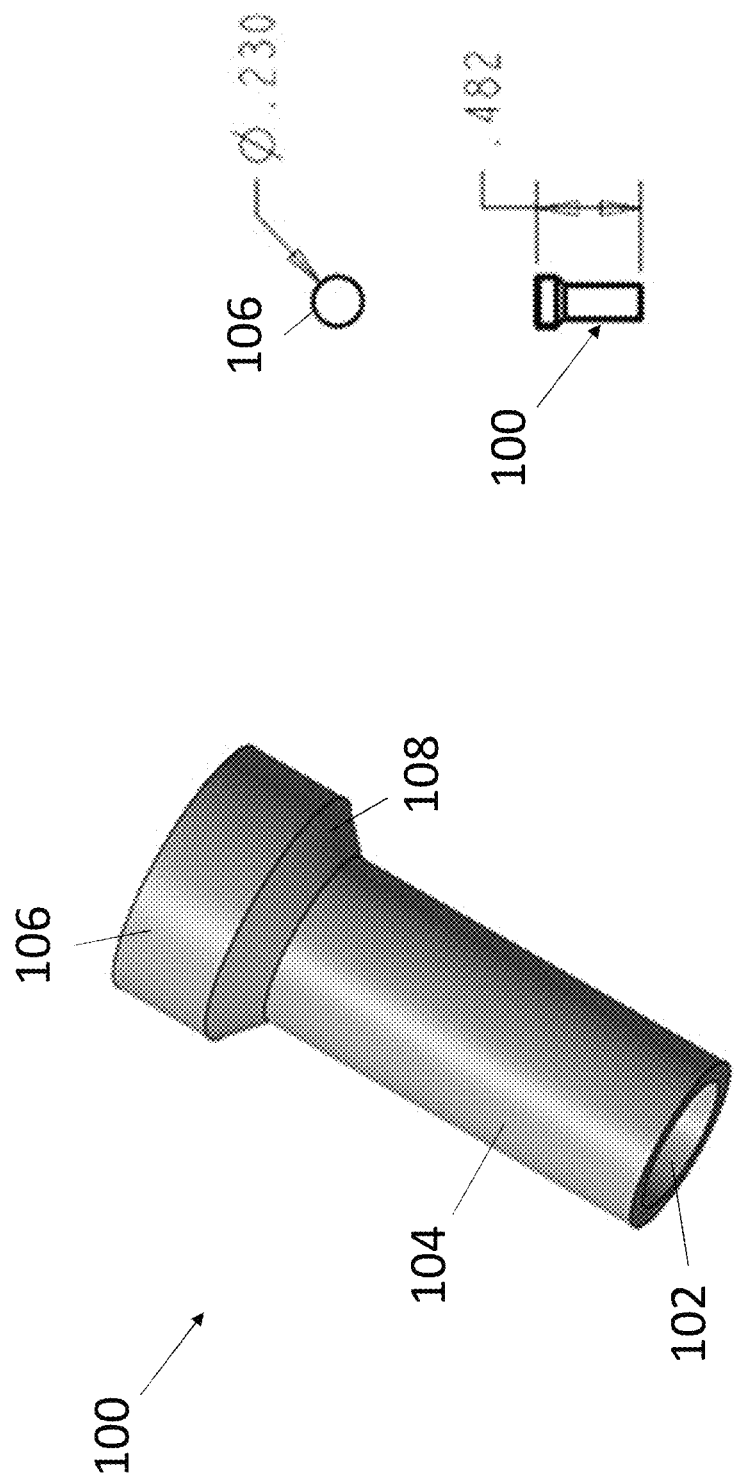
FIG. 1A is a perspective view of a dustcap.
FIG. 1B shows an exemplary size of the dustcap of FIG. 1A.

FIG. 1A is a perspective view of a dustcap 100. The dustcap 100 is a standard dustcap configured to cover an optical fiber connector ferrule. The dustcap 100 has a tube 102 configured to receive a ferrule of an optical fiber connector. The dustcap 100 has a cylindrical portion 104 and an end portion 106 at one end of the cylindrical portion. The end portion 106 is also cylindrical shaped, with a tapering portion 108 extending towards the cylindrical portion 104. A diameter of the cylindrical part of the end portion 106 is larger than the diameter of the cylindrical portion 104. The end portion 106 may be configured for holding the dustcap such that it may be placed on or removed from the connector.

FIG. 1B shows an exemplary size of the dustcap 100. For example, the dustcap 100 has a length of about 0.48 inches from the bottom of the cylindrical portion 104 to the top of the end portion 106. The end portion 106 is shown to have a diameter of about 0.23 inches.

Figure 2B:
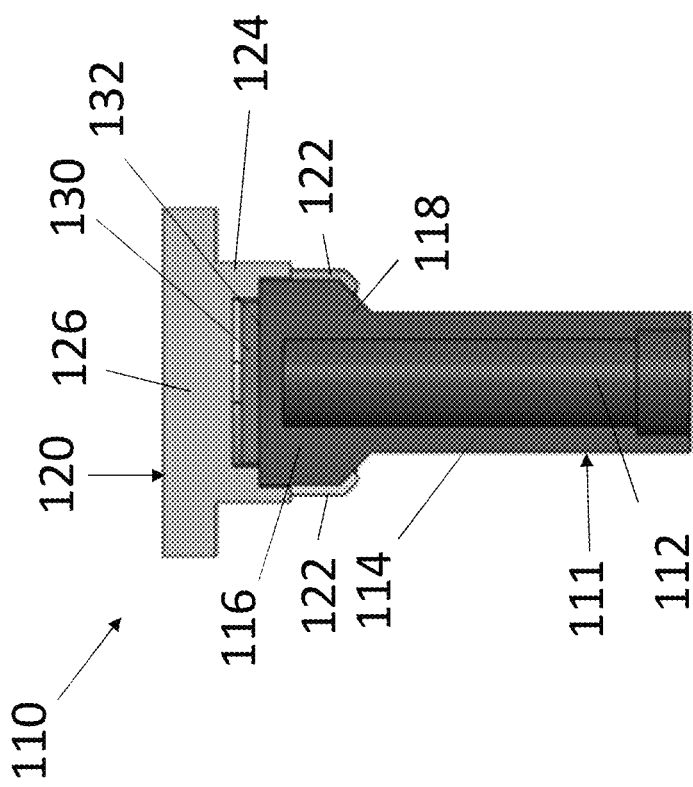
FIG. 2B is a cross-sectional view of the dustcap of FIG. 2A according to aspects of the present disclosure.
Figure 2A:
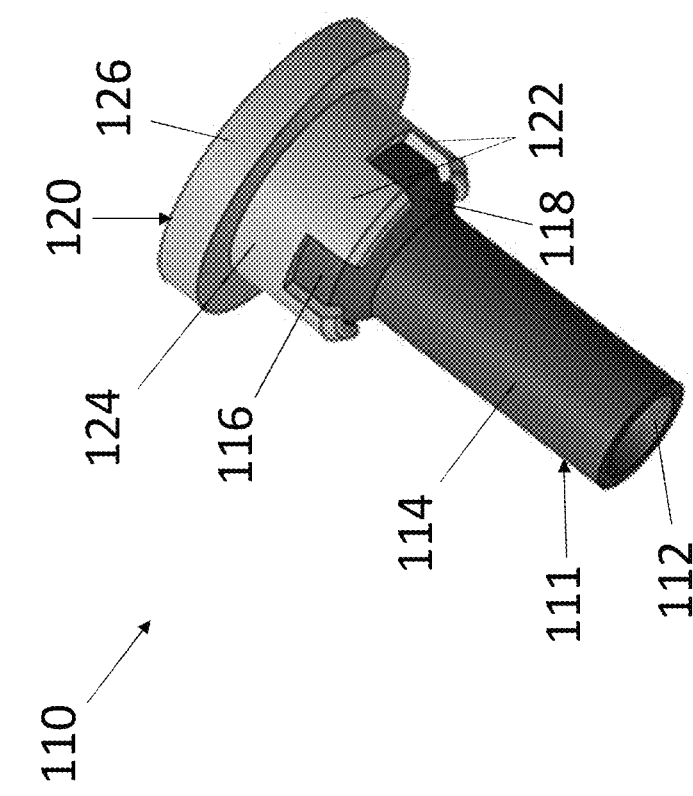
FIG. 2A is a perspective view of one embodiment of a dustcap including a cleaner according to aspects of the present disclosure.

FIG. 2A is a perspective view and FIG. 2B is a cross-sectional view of one embodiment of a dustcap 110 including a built-in cleaner. The dustcap 110 has a body 111 configured similarly to the dustcap 100. For example, the dustcap 110 has a tube 112 configured to receive a ferrule of an optical fiber connector. The dustcap 110 has a cylindrical portion 114 and an end portion 116 at one end of the cylindrical portion. The end portion 116 is also cylindrical shaped, with a tapering portion 118 extending towards the cylindrical portion 114. A diameter of the cylindrical part of the end portion 116 is larger than the diameter of the cylindrical portion 114.

The dustcap 110 further comprises a cover 120 configured to couple to the body 111 of the dustcap. For example, the cover 120 is configured to couple to the end portion 116 of the dustcap. The cover 120 has a plurality of tabs 122 configured to couple to at least a part of the end portion 116 and the tapered portion 118 of the dustcap 110, so as to snap the cover to the body 111 of the dustcap. The tabs 122 are also tapered at one end such that the tapered ends of the tabs couple to the tapered portion 118 of the dustcap. The tabs 122 protrude from a first portion 124 of the cover 120, forming a cylindrical structure around the end portion 116 of the dustcap. The cover 122 also comprises a second portion 126 having a diameter larger than the first portion 124, for example to facilitate holding the cover 120. The cover 120 is configured to be placed on and removed from the body 111 of the dustcap. In other embodiments, the cover 120 may be coupled to the body of the dustcap using any connection mechanism, including but not limited to, for example, a latch, a hinge, or a threaded connection.

As shown in FIG. 2B, when the cover 120 is placed over the end portion 116 of the dustcap 110, an interior chamber 128 is formed between the cover and the body 111 of the dustcap. A cleaner 130 is placed in the interior chamber 128 between the cover 120 and the body 111 of the dustcap. The cleaner 130 may be attached, for example, to the top surface 132 of the end portion 116. The cover 120 may be removed from the body 111 of the dustcap 110 to expose the cleaner 130 at the end of the body. The cleaner 130 may then be used to clean the connector ferrule. In other embodiments, the cleaner may be attached to the cover rather than the body of the dustcap.

Figure 2C:
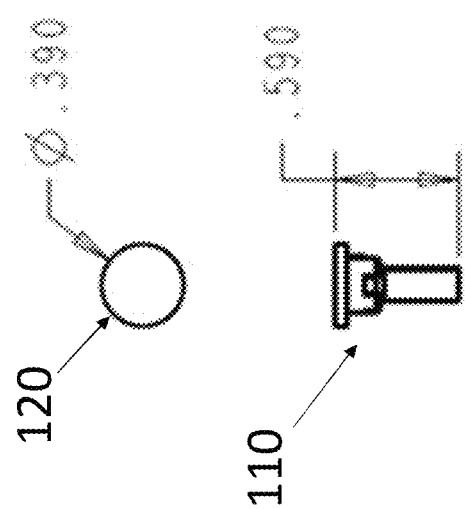
FIG. 2C shows an exemplary size of the dustcap of FIG. 2A according to aspects of the present disclosure.

FIG. 2C shows an exemplary size of the dustcap 110. For example, the dustcap 110 has a length of about 0.59 inches from the bottom of the cylindrical portion 114 to the top of the cover 120. The top of the cover 120 is shown to have a diameter of about 0.39 inches.

Figure 2E:
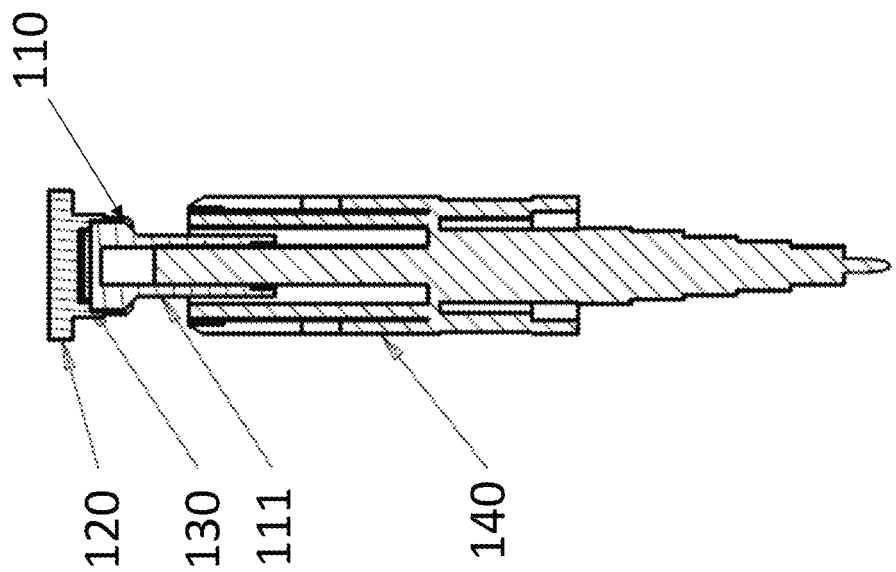
FIG. 2E is a cross-sectional view of the dustcap of FIG. 2A inserted into an optical fiber connector according to aspects of the present disclosure.
Figure 2D:
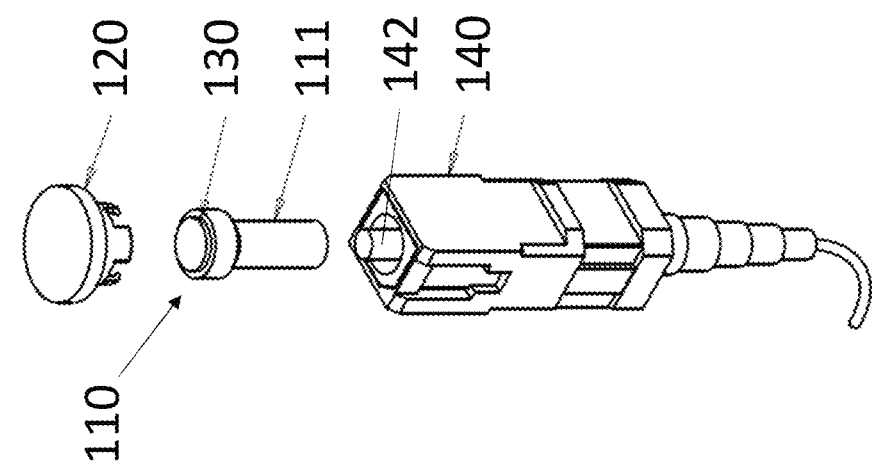
FIG. 2D is a perspective view of the dustcap of FIG. 2A being inserted into an optical fiber connector according to aspects of the present disclosure.

FIG. 2D is a perspective view of the dustcap 110 being inserted into an optical fiber connector 140 having a ferrule 142. FIG. 2E shows a cross-sectional view of the dustcap 110 inserted into the optical fiber connector 140. Referring to FIGS. 2D and 2E, the body 111 of the dustcap 110 is shown to have an end portion with a flat surface. The cleaner 130 is attached to the flat surface. The cover 120 is configured to snap onto the end portion of the body 111.

Figure 3B:
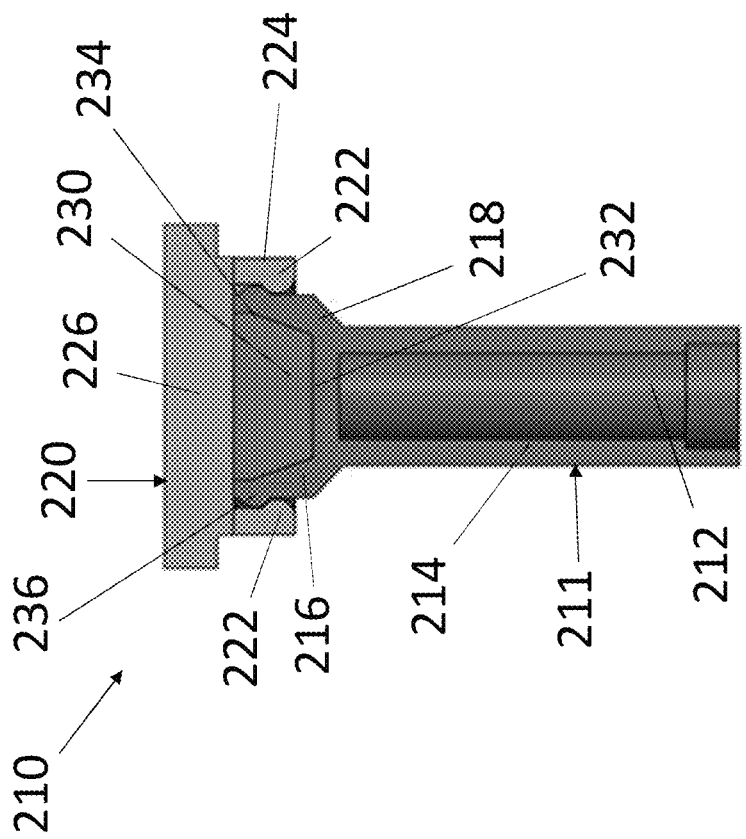
FIG. 3B is a cross-sectional view of the dustcap of FIG. 3A according to aspects of the present disclosure.
Figure 3A:
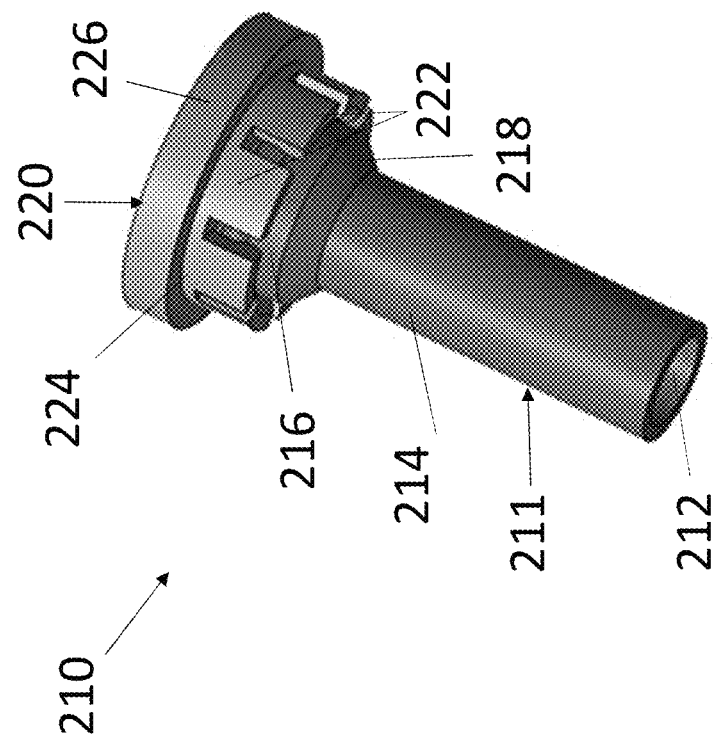
FIG. 3A is a perspective view of another embodiment of a dustcap including a cleaner according to aspects of the present disclosure.

FIG. 3A is a perspective view and FIG. 3B is a cross-sectional view of another embodiment of a dustcap 210 including a built-in cleaner. The dustcap 210 has a body 211. The body 211 of the dustcap 210 has a tube 212 configured to receive a ferrule of an optical fiber connector. The dustcap 210 has a cylindrical portion 214 and an end portion 216 at one end of the cylindrical portion. The end portion 216 has a tapering portion 218 extending towards the cylindrical portion 214. A diameter of the end portion 216 is larger than the diameter of the cylindrical portion 214. In this embodiment, the end portion 216 has a receptacle 234 formed therein. The receptacle 234 is configured to store the cleaner 230 within the dustcap 210. The receptacle 234 and the tube 212 are disposed at opposite ends of the dustcap 210, separated by a divider 232 forming the bottom surface of the end portion 216. The cleaner 230 is embedded within the receptacle 234 at the end portion 216 of the dustcap. In other embodiments, the cleaner may be attached to the cover of the dustcap.

The dustcap 210 further comprises a cover 220 configured to couple to the body 211 of the dustcap. For example, the cover 220 is configured to couple to the end portion 216 of the dustcap. The cover 220 has a plurality of tabs 222 configured to couple to a part of the end portion 216 of the dustcap 210, so as to latch the cover to the body 211 of the dustcap. The tabs 222 protrude from a first portion 224 of the cover 220, forming a cylindrical structure around the end portion 216 of the dustcap. The end portion 216 has small protrusions 236 on an exterior of the end portion. The protrusions 236 are configured as stops to prevent the tabs 222 from decoupling from the end portion. The cover 220 also comprises a second portion 226 forming the top of the cover and having a diameter larger than the first portion 224, for example to facilitate holding the cover 220. The cover 220 is configured to be placed on and removed from the body 211 of the dustcap, thereby covering the cleaner 230 within the dustcap 210. In other embodiments, the cover 220 may be coupled to the body of the dustcap using any connection mechanism, including but not limited to, for example, a latch, a hinge, or a threaded connection.

As shown in FIG. 3B, when the cover 220 is placed over the end portion 216 of the dustcap 210, the cleaner 230 is disposed below the cover and within the body 211 of the dustcap. The cleaner 230 may be attached, for example, to the receptacle 234 of the end portion 216. The cover 220 may be removed from the body 211 of the dustcap 210 to expose the cleaner 230 at the end of the body. The cleaner 230 may then be used to clean the connector ferrule. In other embodiments, the cleaner may be attached to the cover rather than the body of the dustcap.

FIG. 3C shows an exemplary size of the dustcap 210. For example, the dustcap 210 has a length of about 0.65 inches from the bottom of the cylindrical portion 214 to the top of the cover 220. The top of the cover 220 is shown to have a diameter of about 0.39 inches.

Figure 3E:
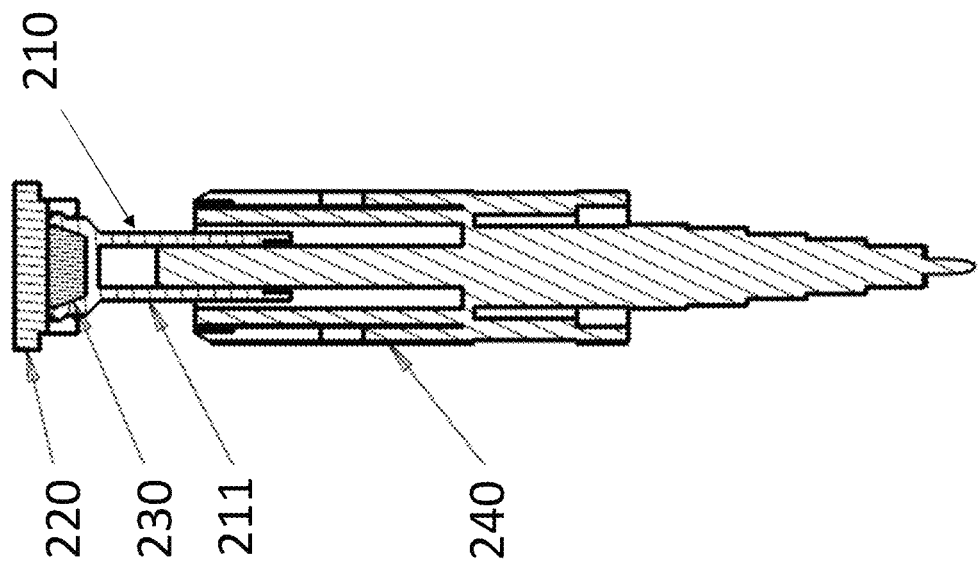
FIG. 3E is a cross-sectional view of the dustcap of FIG. 3A inserted into an optical fiber connector according to aspects of the present disclosure.
Figure 3D:
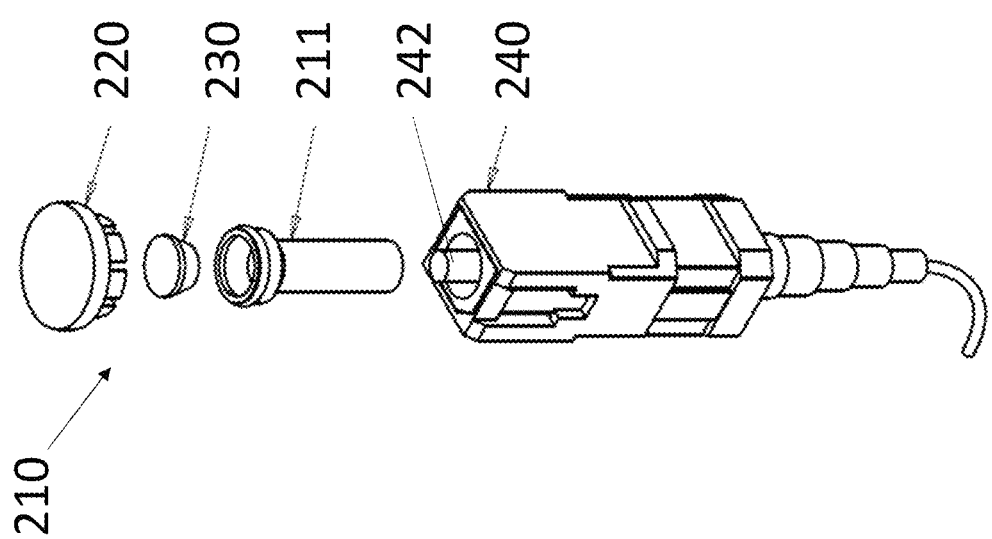
FIG. 3D is a perspective view of the dustcap of FIG. 3A being inserted into an optical fiber connector according to aspects of the present disclosure.

FIG. 3D is a perspective view of the dustcap 210 being inserted into an optical fiber connector 240 having a ferrule 242. FIG. 3E shows a cross-sectional view of the dustcap 210 inserted into the optical fiber connector 240. Referring to FIGS. 3D and 3E, the body 211 of the dustcap 210 is shown to have an end portion having a receptacle. The cleaner 230 is inserted into the receptacle. The cover 220 is configured to snap onto the end portion of the body 211.

Figure 4B:
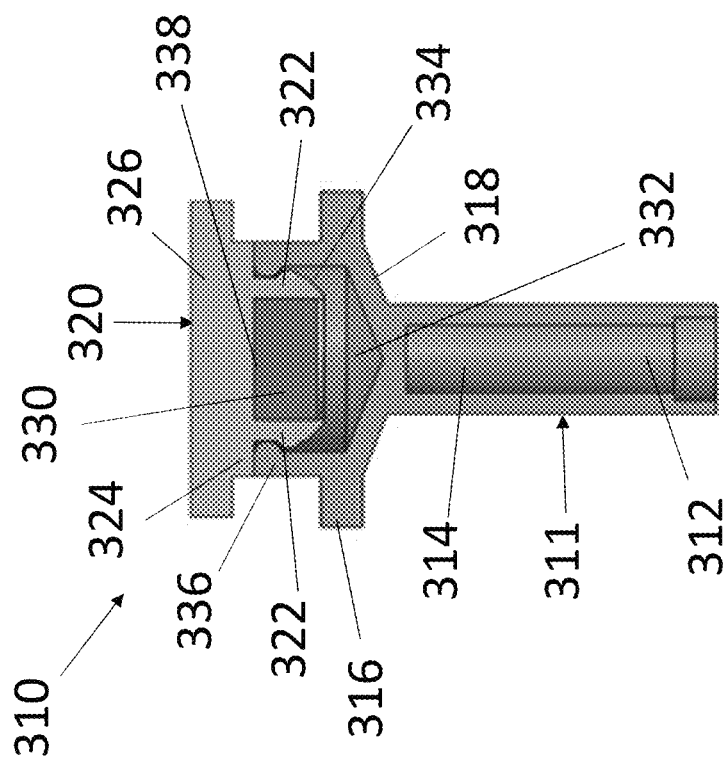
FIG. 4B is a cross-sectional view of the dustcap of FIG. 4A according to aspects of the present disclosure.
Figure 4A:
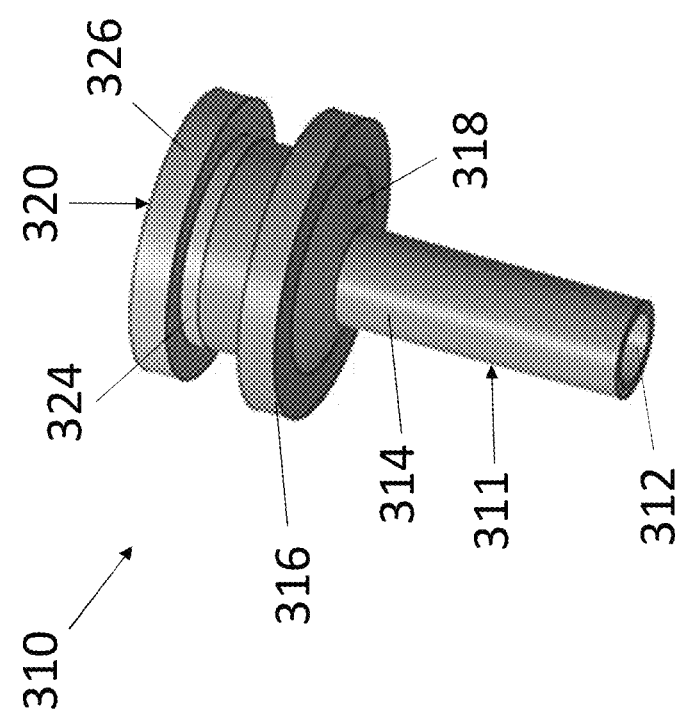
FIG. 4A is a perspective view of another embodiment of a dustcap including a cleaner according to aspects of the present disclosure.

FIG. 4A is a perspective view and FIG. 4B is a cross-sectional view of another embodiment of a dustcap 310 including a built-in cleaner. The dustcap 310 has a body 311. The body 311 of the dustcap 310 has a tube 312 configured to receive a ferrule of an optical fiber connector. The dustcap 310 has a cylindrical portion 314 and an end portion 316 at one end of the cylindrical portion. The end portion 316 has a tapering portion 318 extending towards the cylindrical portion 314. A diameter of the end portion 316 is larger than the diameter of the cylindrical portion 314. In this embodiment, the end portion 316 has a receptacle 334 formed therein. The receptacle 334 is configured to receive the cover 320 of the dustcap 310. The receptacle 334 and the tube 312 are disposed at opposite ends of the dustcap 310, separated by a divider 332 forming a part of the end portion 316.

The dustcap 310 further comprises a cover 320 configured to couple to the body 311 of the dustcap. For example, the cover 320 is configured to be partially inserted into the end portion 316 of the dustcap 310. The cover 320 has a plurality of tabs 322 configured to be inserted into the end portion 316 of the dustcap 310, so as to latch the cover to the body 311 of the dustcap. The end portion 316 has small protrusions 336 configured as stops to prevent the tabs 322 from spontaneously decoupling from the end portion. The tabs 322 protrude from a first portion 324 of the cover 320. The cover 320 also comprises a second portion 326 forming the top of the cover and having a diameter larger than the first portion 324, for example to facilitate holding the cover 320. The cover 320 has a receptacle 338 bound partially by the tabs 322. In this embodiment, the cleaner 330 is embedded within the receptacle 338 of the cover 320. In other embodiments, the cleaner may be attached to the body of the dustcap. The cover 320 with the built-in cleaner 330 is configured to be placed on and removed from the body 311 of the dustcap 310. In various embodiments, the cover 220 may be coupled to the body of the dustcap using any connection mechanism, including but not limited to, for example, a latch, a hinge, or a threaded connection.

As shown in FIG. 4B, when the cover 320 is placed over the end portion 316 of the dustcap 310, the cleaner 330 is disposed within the receptacle 338 of the cover, which is inserted into the receptacle 334 of the end portion 316 of the dustcap. The cleaner 330 may be attached, for example, to the receptacle 338 of the cover 320. The cover 320 may be removed from the body 311 of the dustcap 310 to expose the cleaner 330 embedded within the cover 320. The cleaner 330 may then be used to clean the connector ferrule. In other embodiments, the cleaner may be attached to the body of the dustcap rather than the cover of the dustcap.

Figure 4C:
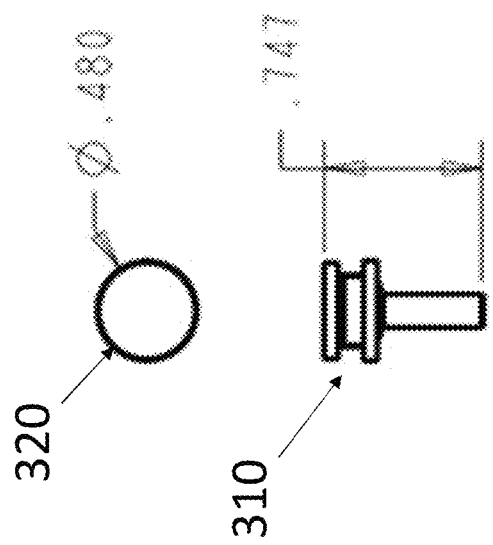
FIG. 4C shows an exemplary size of the dustcap of FIG. 4A according to aspects of the present disclosure.

FIG. 4C shows an exemplary size of the dustcap 310. For example, the dustcap 310 has a length of about 0.75 inches from the bottom of the cylindrical portion 314 to the top of the cover 320. The top of the cover 320 is shown to have a diameter of about 0.48 inches.

Figure 4E:
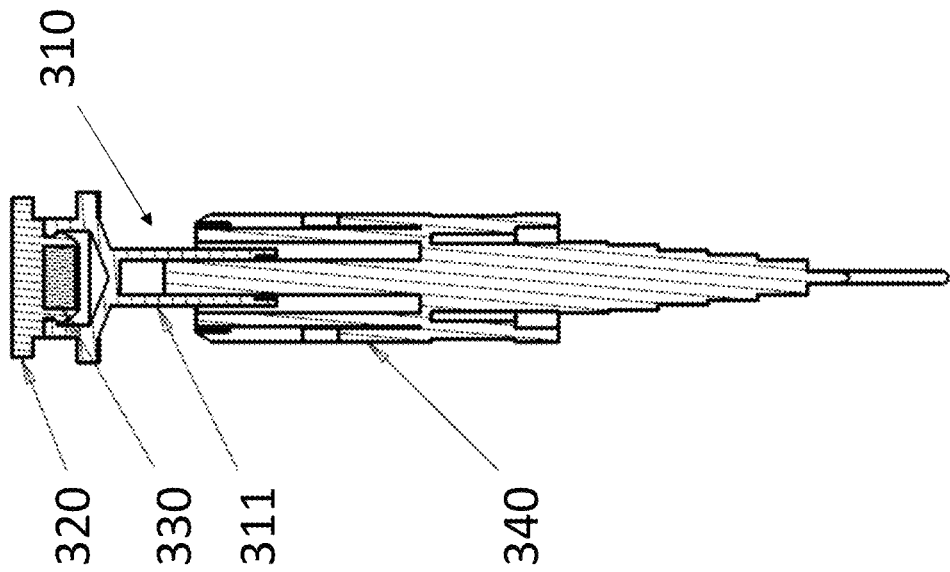
FIG. 4E is a cross-sectional view of the dustcap of FIG. 4A inserted into an optical fiber connector according to aspects of the present disclosure.
Figure 4D:
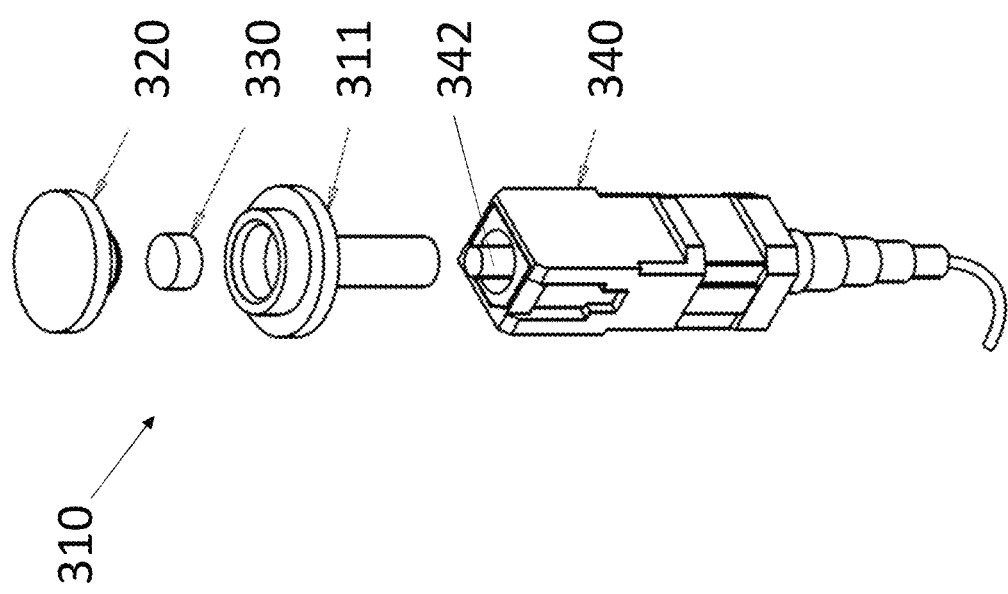
FIG. 4D is a perspective view of the dustcap of FIG. 4A being inserted into an optical fiber connector according to aspects of the present disclosure.

FIG. 4D is a perspective view of the dustcap 310 being inserted into an optical fiber connector 340 having a ferrule 342. FIG. 4E shows a cross-sectional view of the dustcap 310 inserted into the optical fiber connector 340. Referring to FIGS. 4D and 4E, the body 311 of the dustcap 310 is shown to have an end portion having a receptacle configured to receive the cover 320. The cover 320 has a receptacle configured to receive the cleaner 330. The receptacle of the end portion of the body 311 is configured to receive the cover 320 including the cleaner 330. In various embodiments, the optical fiber connector is an SC connector. However, various embodiments of dustcaps with cleaners disclosed herein may be configured for other types of connectors.

Figure 5B:
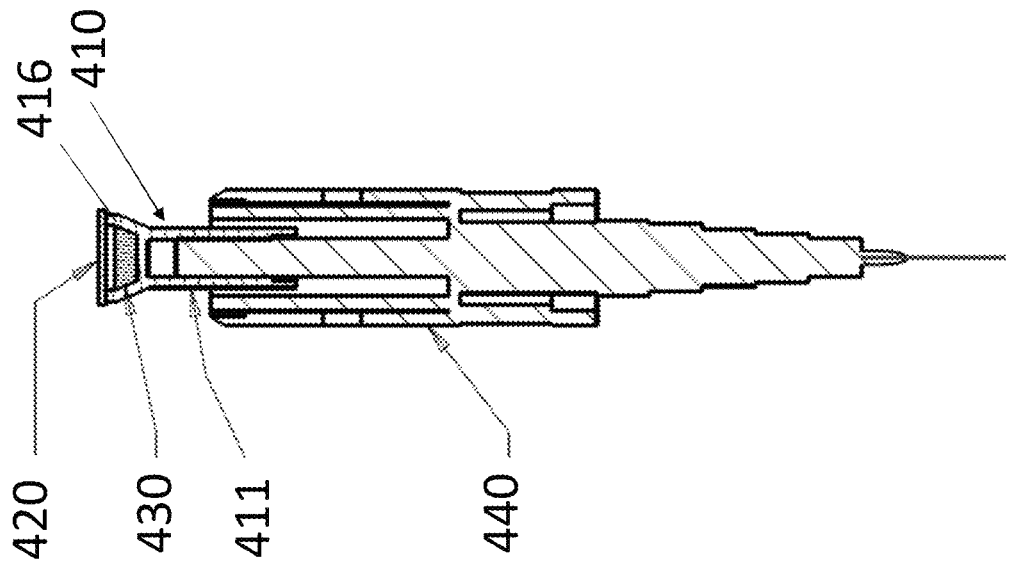
FIG. 5B is a cross-sectional view of the dustcap of FIG. 5A inserted into an optical fiber connector according to aspects of the present disclosure.
Figure 5A:
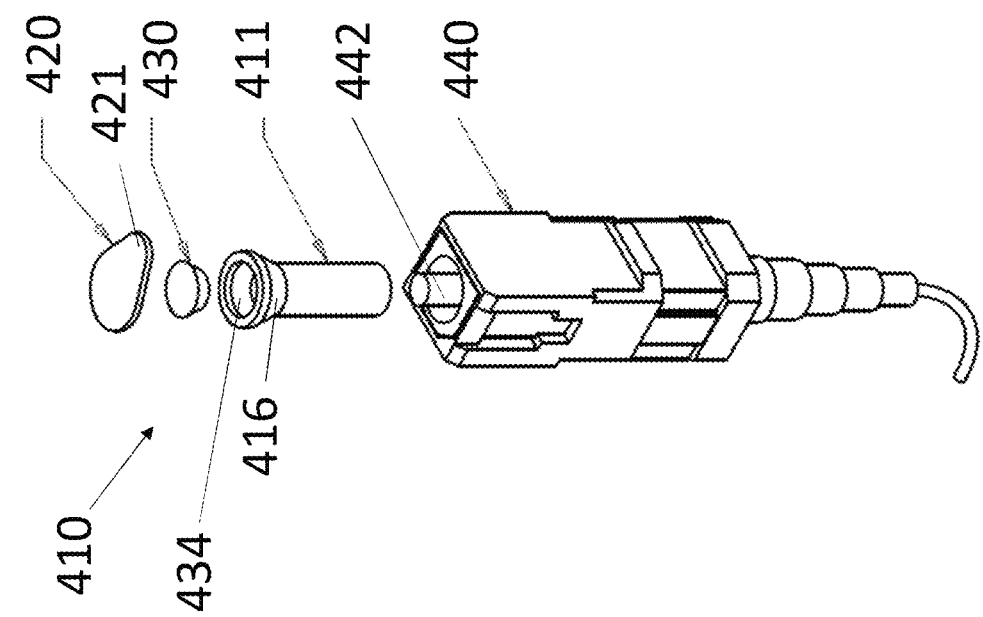
FIG. 5A is a perspective view of another embodiment of a dustcap with cleaner being inserted into an optical fiber connector according to aspects of the present disclosure.

FIG. 5A shows a dustcap 410 with cleaner 430 being inserted into an optical fiber connector 440. The optical fiber connector 440 has a ferrule 442. The dustcap 410 is configured to receive the ferrule 442. FIG. 5B is a cross-sectional view of the dustcap 410 inserted into the optical fiber connector 430. The dustcap 410 is configured similarly to the dustcap 210 of FIGS. 3A to 3E. Referring to FIGS. 5A and 5B, the dustcap 410 has a body 411 having an end portion 416. The end portion 416 includes a receptacle 434. The receptacle 434 is configured to receive the cleaner 430. The end portion 416 of the dustcap 410 is further configured to receive a sealing film 420. The sealing film 420 may be a flat film for covering the cleaner 430 of the dustcap 410. The sealing film 420 may be shaped as an oval or may have a protruding portion 421 that extends beyond the size of the end portion of the dustcap 410, for example to facilitate removal of the sealing film from the body of the dustcap.

Figure 6B:
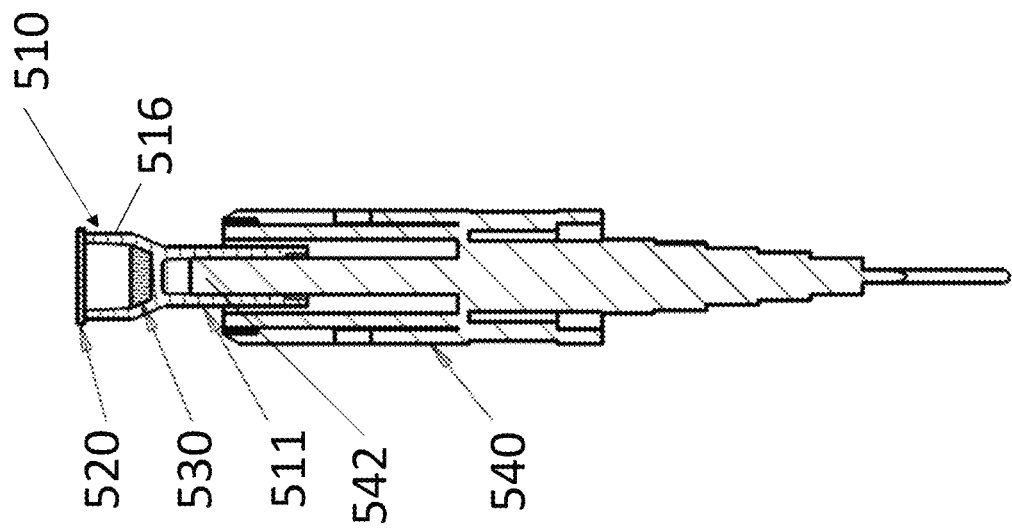
FIG. 6B is a cross-sectional view of the dustcap of FIG. 6A inserted into an optical fiber connector according to aspects of the present disclosure.
Figure 6A:
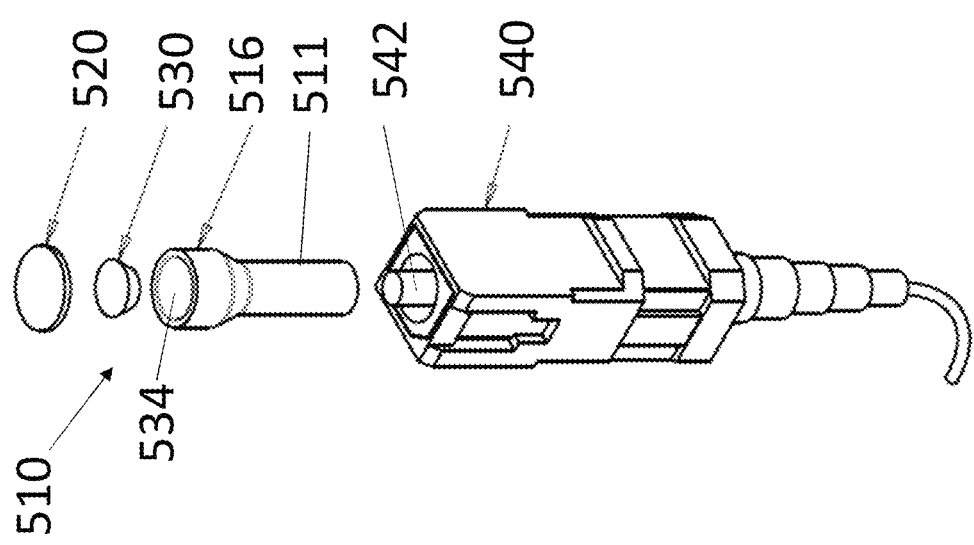
FIG. 6A is a perspective view of another embodiment of a dustcap with cleaner being inserted into an optical fiber connector according to aspects of the present disclosure.

FIG. 6A shows a dustcap 510 with cleaner 530 being inserted into an optical fiber connector 540. The optical fiber connector 540 has a ferrule 542. The dustcap 510 is configured to receive the ferrule 542. FIG. 6B is a cross-sectional view of the dustcap 510 inserted into the optical fiber connector 530. The dustcap 510 is configured similarly to the dustcap 210 of FIGS. 3A to 3E. Referring to FIGS. 6A and 6B, the dustcap 510 has a body 511 having an end portion 516. The end portion 516 includes a receptacle 534. The receptacle 534 is configured to receive the cleaner 530. The end portion 516 of the dustcap 510 is further configured to receive a sealing film 520. The sealing film 520 may be a flat film for covering the cleaner 530 of the dustcap 510. In this embodiment, the sealing film 520 is shaped and sized to match the shape and size of the end portion 516 of the dustcap 510. In other embodiments, the sealing film may be shaped or sized differently. In this embodiment, the end portion 516 of the dustcap 510 is longer than the length of the cleaner 530. Thus, a space remains above the cleaner 530 within the cavity 534. In other embodiments, the cleaner may completely fill the cavity. In yet other embodiments, the cleaner may protrude outside the cavity.

Figure 7B:
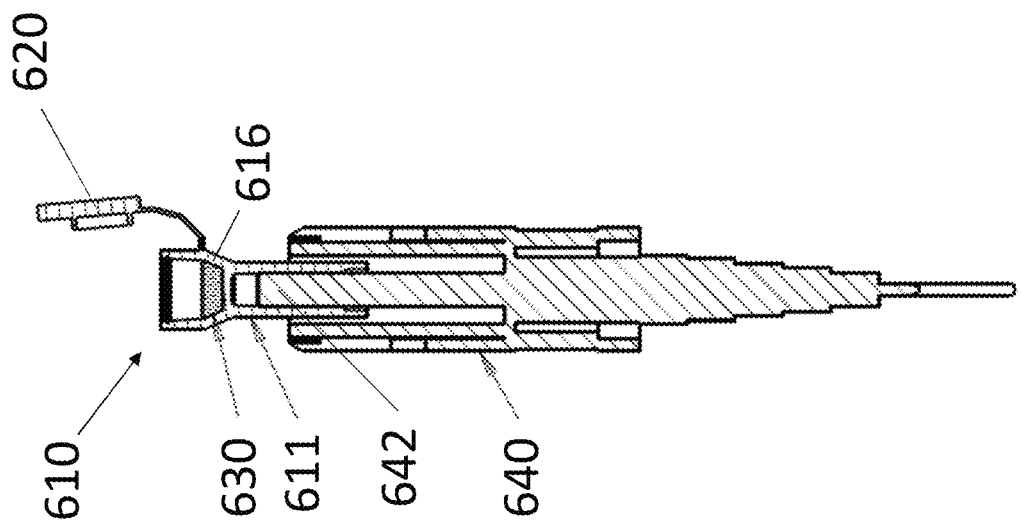
FIG. 7B is a cross-sectional view of the dustcap of FIG. 7A inserted into an optical fiber connector according to aspects of the present disclosure.
Figure 7A:
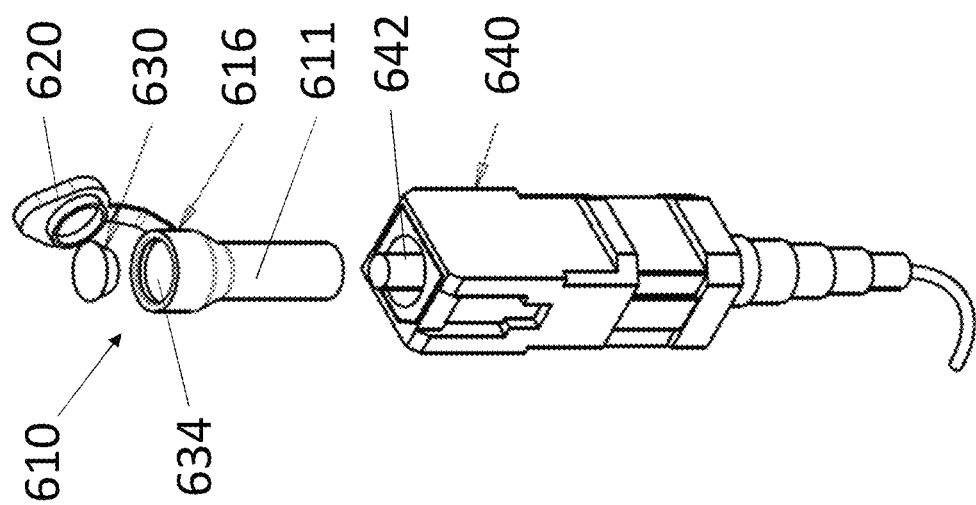
FIG. 7A is a perspective view of another embodiment of a dustcap with cleaner being inserted into an optical fiber connector according to aspects of the present disclosure.

FIG. 7A shows a dustcap 610 with cleaner 630 being inserted into an optical fiber connector 640. The optical fiber connector 640 has a ferrule 642. The dustcap 610 is configured to receive the ferrule 642. FIG. 7B is a cross-sectional view of the dustcap 610 inserted into the optical fiber connector 630. The dustcap 610 is configured similarly to the dustcap 510 of FIGS. 6A and 6B, but has a hinged cover 620 instead of the sealing film 520 of FIGS. 6A and 6B. Referring to FIGS. 7A and 7B, the dustcap 610 has a body 611 having an end portion 616. The end portion 616 includes a receptacle 634. The receptacle 634 is configured to receive the cleaner 630. The dustcap 610 has an integrated cover 620. The cover 620 is hinged, and coupled to the end portion 616 of the body 611. The hinged cover 620 may be shaped and sized to match the shape and size of the end portion 616 of the dustcap 610, or may be shaped or sized differently. For example, the cover 620 may have a protruding portion to allow easier opening of the cover. In this embodiment, the end portion 616 of the dustcap 610 is longer than the length of the cleaner 630. Thus, a space remains above the cleaner 630 within the cavity 634. In other embodiments, the cleaner may completely fill the cavity. In yet other embodiments, the cleaner may protrude outside the cavity.

Various embodiments of dustcaps described above are configured to include cleaners. In other embodiments, a cleaner assembly separate from the dustcap may be provided, as shown and described below in relation to FIGS. 8A and 8B.

Figure 8B:
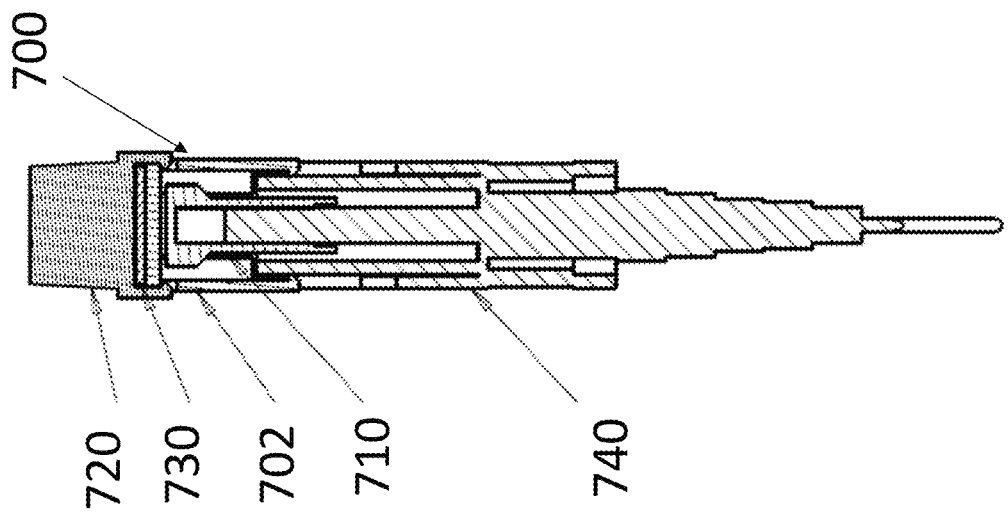
FIG. 8B is a cross-sectional view of the cleaner assembly of FIG. 8A coupled to an optical fiber connector according to aspects of the present disclosure.
Figure 8A:
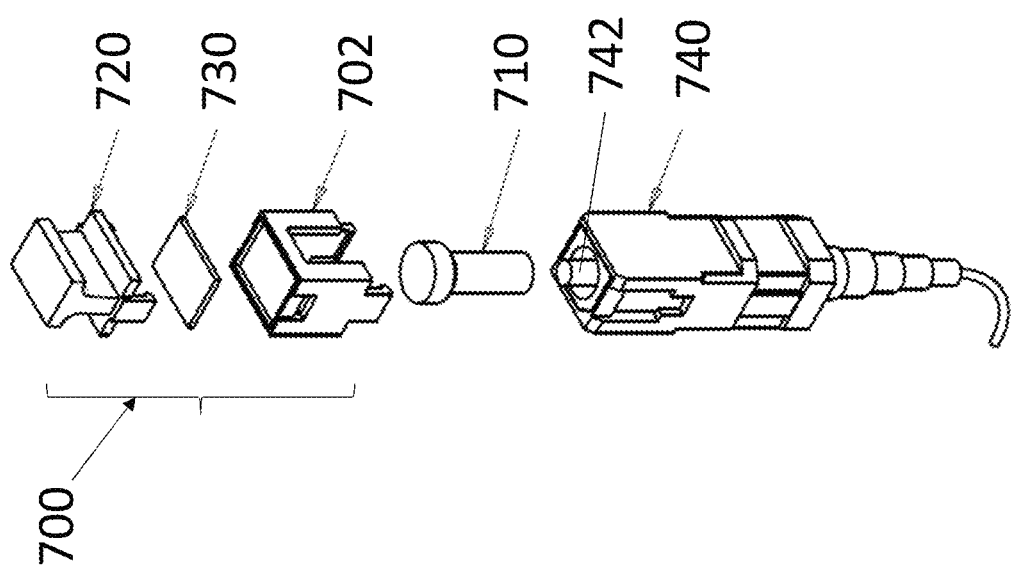
FIG. 8A is a perspective view of one embodiment of a cleaner assembly for coupling to an optical fiber connector according to aspects of the present disclosure.

FIG. 8A shows one embodiment of a cleaner assembly 700 for coupling to an optical fiber connector 740. The optical fiber connector 740 has a ferrule 742. A dustcap 710 for the ferrule 742 is configured to be inserted into the optical fiber connector 740. FIG. 8B is a cross-sectional view of the cleaner assembly 700 of FIG. 8A coupled to the optical fiber connector 740. Referring to FIGS. 8A and 8B, the cleaner assembly 700 has a body 702. The body 702 is configured to receive the dustcap 710. The body 702 is further configured to snap into the housing of the optical fiber connector 740. In other embodiments, other connection mechanisms may be used. The body 702 includes a top flat surface configured to receive a cleaner 730. The cleaner 730 is also flat and has a rectangular shape that matches that of the body 702. However, in other embodiments, the cleaner may be shaped differently, and the body 702 may have a receptacle rather than a flat surface for receiving the cleaner. Other shapes and arrangements of the body of the cleaner assembly and the cleaner are also within the scope of this disclosure. The cleaner assembly 700 further comprises a cover 720 configured to snap into the body 702. In other embodiments, the cover 720 may also be connected to the body 702 using any other connection mechanism. The cover 720 may have a receptacle configured to provide space for the cleaner 730. The cover 720 may be configured to include a handle to enable easier opening and removal of the cover. The cleaner assembly 700 is separate from the dustcap 710, but configured to receive the dustcap by providing a space within the body of the cleaner assembly for storage of the dustcap. In this embodiment, the cleaner assembly is configured to couple to the housing of the optical fiber connector. In other embodiments, the cleaner assembly may be configured to couple instead to the dustcap.

Various embodiments of dustcaps having cleaners and embodiments of cleaner assemblies were provided for optical fiber connectors and ferrules. The various disclosed embodiments may also be provided for adapters. For example, the dustcaps having cleaners may be configured for coupling to optical fiber adapters. Cleaner assemblies disclosed herein may also be configured for coupling to optical fiber adapters. Some examples of adapter dustcaps including cleaners are shown and described below in relation to FIGS. 9 and 10.

Figure 9B:
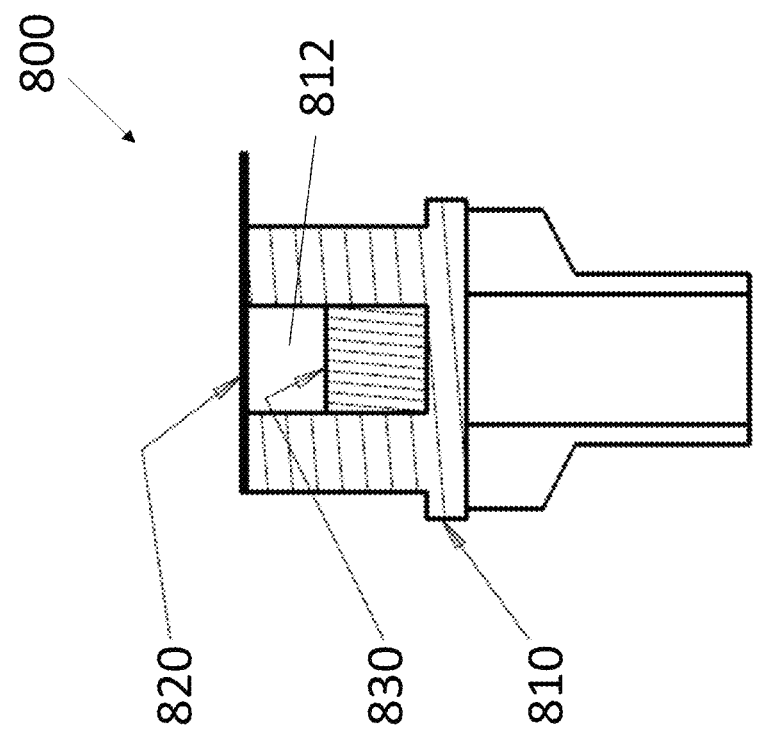
FIG. 9B is a cross-sectional view of the adapter dustcap of FIG. 9A according to aspects of the present disclosure.
Figure 9A:
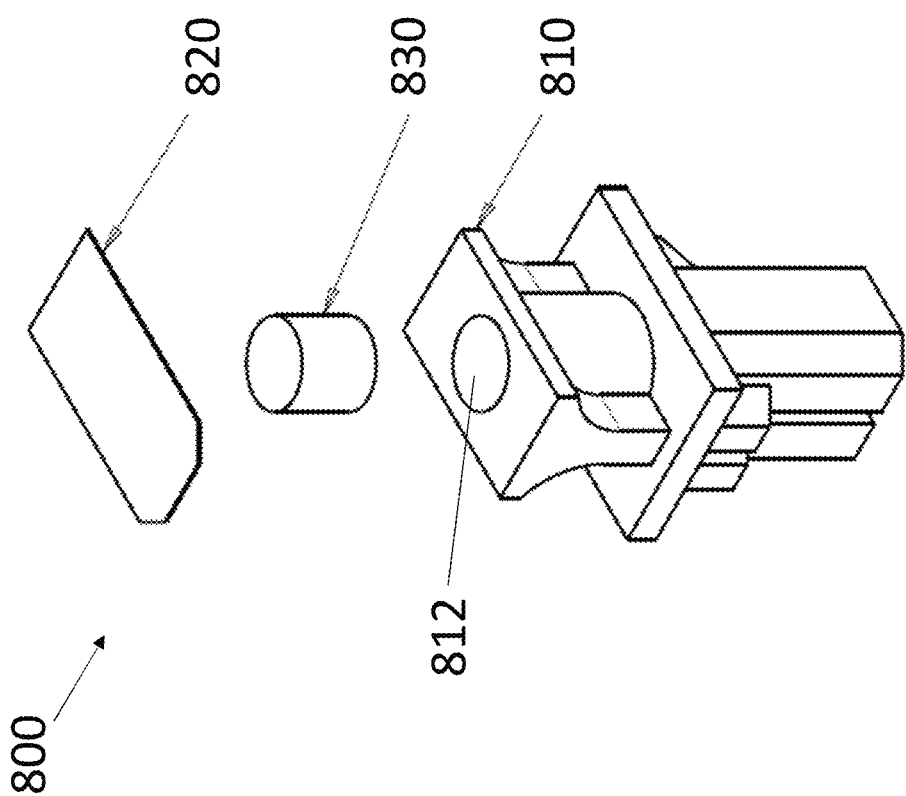
FIG. 9A is a perspective view of one embodiment of an adapter dustcap including a cleaner according to aspects of the present disclosure.

FIG. 9A shows one embodiment of an adapter dustcap 800 including a cleaner 830. FIG. 9B is a cross-sectional view of the adapter dustcap 800. Referring to FIGS. 9A and 9B, the adapter dustcap 800 includes a body 810. The body 810 may be an integral piece or may comprise, for example, a base portion and a cover portion. The body 810 includes a receptacle 812 configured to receive the cleaner 830. The receptacle 812 has a depth exceeding that of the cleaner 830, such that some space remains above the cleaner within the receptacle. In other embodiments, the receptacle may be sized to match the size of the cleaner, or the cleaner may extend beyond the depth of the receptacle. In this embodiment, the adapter dustcap 800 further comprises a sealing film 820. The sealing film 820 is a flat film configured to cover a top portion of the body 810, including the receptacle 812. The sealing film 820 may extend beyond the top portion of the body 810, to facilitate removal of the sealing film from the adapter dustcap.

Figure 10B:
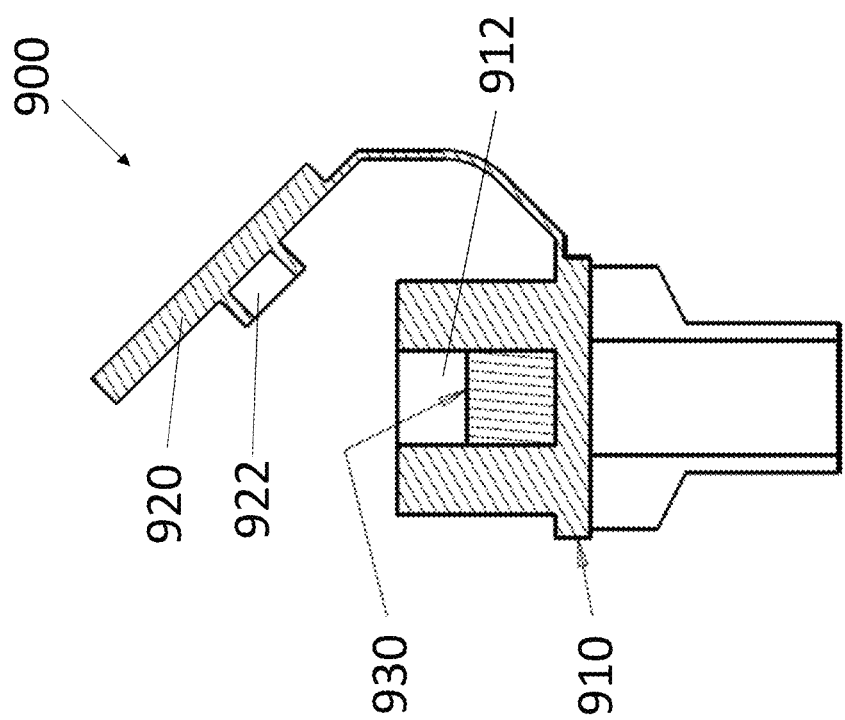
FIG. 10B is a cross-sectional view of the adapter dustcap of FIG. 10A according to aspects of the present disclosure.
Figure 10A:
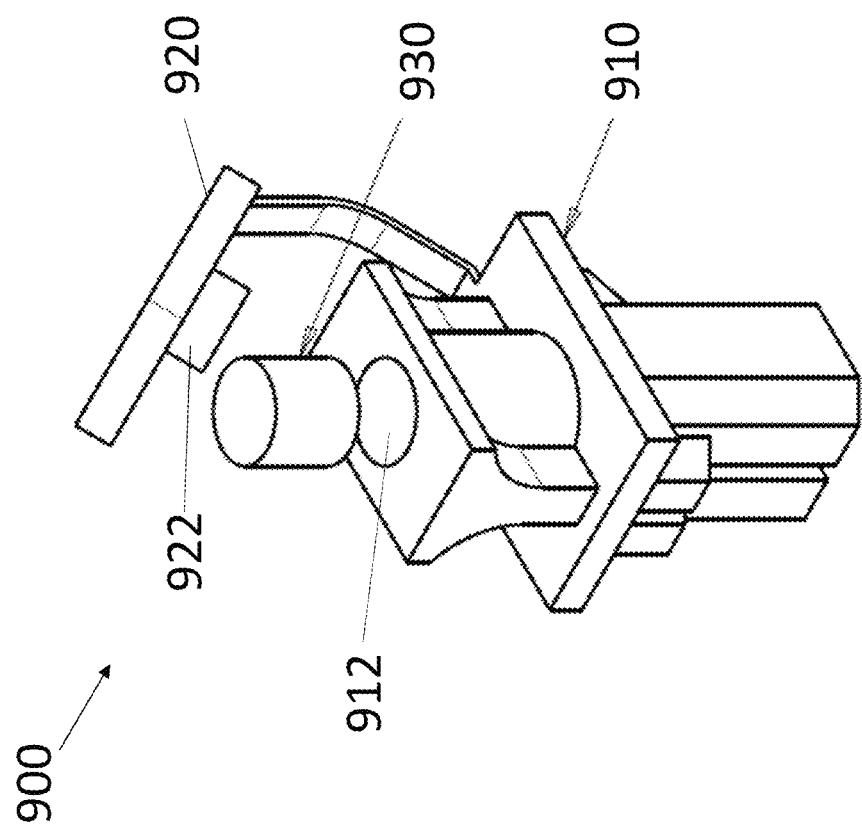
FIG. 10A is a perspective view of another embodiment of an adapter dustcap including a cleaner according to aspects of the present disclosure.

FIG. 10A shows another embodiment of an adapter dustcap 900 including a cleaner 930. FIG. 10B is a cross-sectional view of the adapter dustcap 900. The adapter dustcap 900 is configured similarly to the adapter dustcap 800 of FIG. 9, but is configured to have a hinged cover 920 rather than a sealing film. Referring to FIGS. 10A and 10B, the adapter dustcap 900 includes a body 910. The body 910 may be an integral piece or may comprise, for example, a base portion and a cover portion. The body 910 includes a receptacle 912 configured to receive the cleaner 930. The receptacle 912 has a depth exceeding that of the cleaner 930, such that some space remains above the cleaner within the receptacle. In other embodiments, the receptacle may be sized to match the size of the cleaner, or the cleaner may extend beyond the depth of the receptacle. In this embodiment, the adapter dustcap 900 further comprises a hinged cover 920. The hinged cover 920 is hinged to the body 910. The hinged cover 920 includes a cylindrical portion 922 configured to fit within the empty space above the cleaner 930 within the receptacle 912, for example to retain the hinged cover 920 in a closed position relative to the body 910 of the adapter dustcap 900.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A dustcap comprising:
a body comprising a cylindrical portion configured to receive a ferrule of an optical fiber connector, and an end portion opposite the cylindrical portion, the end portion having a tapered portion extending towards the cylindrical portion and a diameter of a cylindrical part of the end portion larger than a second diameter of the cylindrical portion, wherein the end portion includes a receptacle;
a cleaner disposed within the receptacle; and
a cover configured to couple to the end portion of the body.

2. The dustcap of claim 1, wherein the cover is removable from the end portion of the body.

3. The dustcap of claim 1, wherein the cover comprises a plurality of tabs configured to snap on the end portion of the body.

4. The dustcap of claim 1, wherein the body further comprises a divider between the cylindrical portion and the end portion of the body.

5. The dustcap of claim 1, wherein the cover is a sealing film.

6. A dustcap comprising:
a cover having a receptacle;
a cleaner disposed within the receptacle; and
a body comprising a cylindrical portion configured to receive a ferrule of an optical fiber connector, and an end portion opposite the cylindrical portion, the end portion having a tapered portion extending towards the cylindrical portion and a diameter of a cylindrical part of the end portion larger than a second diameter of the cylindrical portion, wherein the end portion is configured to receive at least a portion of the cover.

7. The dustcap of claim 6, wherein the cover is removable from the end portion of the body.

8. The dustcap of claim 6, wherein the cover comprises a plurality of tabs configured to snap into the end portion of the body.

9. The dustcap of claim 6, wherein the body further comprises a divider between the cylindrical portion and the end portion of the body.

10. The dustcap of claim 6, wherein the body is configured as an integral piece.

11. A dustcap comprising:
a body comprising a cylindrical portion configured to receive a ferrule of an optical fiber connector, and an end portion opposite the cylindrical portion, the end portion having a tapered portion extending towards the cylindrical portion and a diameter of a cylindrical part of the end portion that is larger than another diameter of the cylindrical portion, wherein the end portion includes a flat surface;
a cleaner disposed on the flat surface of the end portion; and
a cover configured to receive the end portion of the body.

12. The dustcap of claim 11, wherein the cover is removable from the end portion of the body.

13. The dustcap of claim 11, wherein the cover comprises a plurality of tabs configured to snap on the end portion of the body.

14. The dustcap of claim 11, wherein the body is provided as a single integral piece.

* * * * *